Sept. 18, 1962     D. O. DULUDE     3,054,850
ELECTRICAL BUSHING CONSTRUCTION
Filed Feb. 4, 1960
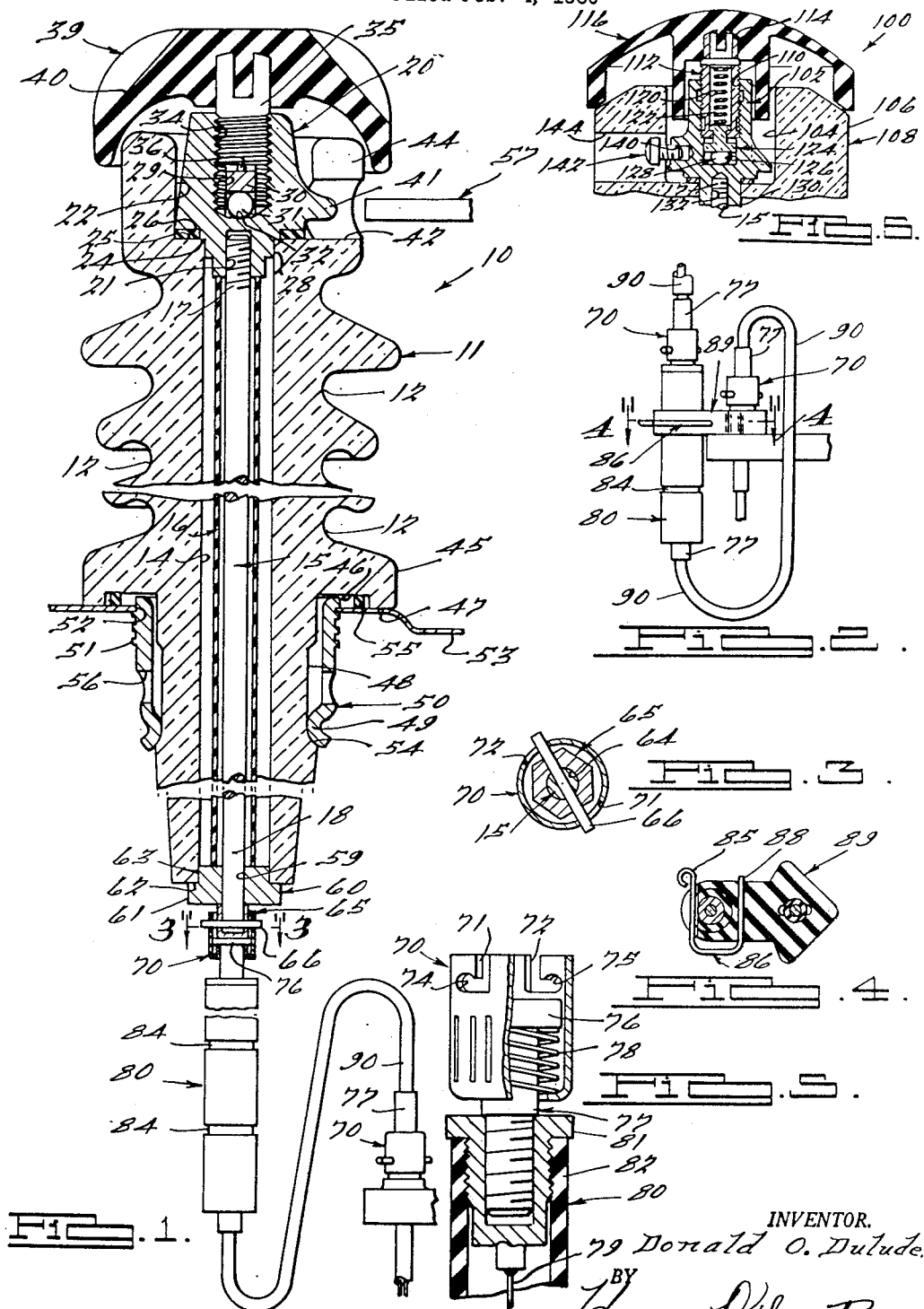
INVENTOR.
Donald O. Dulude
BY
Barnes, Dickey & Pierce
ATTORNEYS.

United States Patent Office 3,054,850
Patented Sept. 18, 1962

3,054,850
ELECTRICAL BUSHING CONSTRUCTION
Donald O. Dulude, Rochester, Mich., assignor to Kuhlman Electric Company, Birmingham, Mich., a corporation of Michigan
Filed Feb. 4, 1960, Ser. No. 6,769
5 Claims. (Cl. 174—145)

This invention relates generally to electrical apparatus, and more particularly to an improved electrical bushing construction.

Electrical bushings are often used, for example, to isolate the electrically energized conductors of a power transmission line from the nonenergized components of an electrical transformer. In such applications the prevention of electrical leakage to ground across the insulating portion of the bushing is of prime importance to preclude predatory discharges over the insulator surface under both normal operating voltage and under any abnormal rise in potential that may occur. Because such bushings are often exposed to the outside environment, they must be capable of withstanding adverse climatic conditions, for example, rain, fog, snow and sleet. Altitude, humidity and dirt conditions are other environmental factors that influence the efficiency of electrical bushings.

Electrical bushings known to the art have been known to fail under the aforementioned operating conditions because such bushings are not satisfactorily protected against the deleterious effects of an adverse environment. When such known bushings are used on electrical transformers, the lightning protection of the transformer is often shorted out by, for example, accumulation of ice on the insulator body. Further, known electrical bushings are characterized by areas of high electrical stress and are therefore susceptible to undesirable corona and arcing.

The electrical bushing of the present invention is relatively well protected against the effects of an adverse environment, particularly ice and snow. Also, the bushing disclosed herein effectively distributes electrical stress between the electrically energized components thereof and adjacent nonenergized members so as to preclude corona and arcing. Further, the bushing is mechanically retained on a supporting member in a novel manner. In addition, the electrically energized components of the bushing are electrically and mechanically interlocked to electrical conductors, for example, a high voltage line and the primary of an electrical transformer, in a novel manner.

Accordingly, one object of the present invention is an improved electrical bushing.

Another object is to protect an electrical bushing against the deleterious effects of ice and snow.

Another object is to protect an electrical bushing against arcing and corona.

Another object is to support an electrical bushing on a nonenergized member in an improved manner.

Another object is to connect the electrically energized conductors of an electrical bushing to a source of electrical energy in an improved manner.

Another object is to connect the electrically energized conductors of an electrical bushing to a load in an improved manner.

Another object is to mount flexible conductors associated with an electrical bushing in an improved manner.

Other objects and advantages of the present invention will become apparent from a study of the following detailed description wherein reference is made to the drawings, in which:

FIGURE 1 is a fragmentary vertical cross-sectional view of an electrical bushing in accordance with an exemplary embodiment of the present invention;

FIG. 2 is a side elevational view of a fuse cartridge and support therefor;

FIG. 3 is a cross-sectional view taken substantially along the line 3—3 of FIG. 1;

FIG. 4 is a cross-sectional view taken substantially along the line 4—4 of FIG. 2;

FIG. 5 is a fragmentary side elevation, partially in section, of the outer shell of a quick disconnect terminal and fuse assembly, enlarged for clarity; and FIG. 6 is a fragmentary vertical cross-sectional view of another embodiment of the electrical bushing.

Referring to the drawings, an electrical bushing 10, in accordance with an exemplary embodiment of the present invention, comprises a body member or insulator 11 of circular horizontal cross section and preferably made from porcelain or other suitable insulating material. The insulator 11 has a plurality of axially spaced, circumferential recesses 12 to maximize the electrical creepage distance longitudinally of the insulator 11. The insulator 11 has a central bore 14 for the accommodation of an elongated conductor rod 15 having an internal insulating tube 16 disposed thereabout. The insulating tube 16 extends from a threaded upper end 17 to a lower end 18 of the rod 15.

A solderless connector 20, preferably cast from electrically conductive material, for example copper, has a threaded bore 21 at the lower end thereof for the acceptance of the threaded end portion 17 of the rod 15. The connector 20 is mounted in a circular counter recess 22 in the upper end of the insulator 11. The connector 20 has an annular shoulder 24 that engages a bottom face 25 of the recess 22 to limit the downward compression of a gasket 26 disposed between the connector 20 and the bottom face 25 of the insulator 11. A circular downwardly extending boss 28 on the connector 20, of approximately the same diameter as the bore 14 in the insulator 11, locates the connector 20 and conductor rod 15 centrally of the insulator 11.

The connector 20 has a vertical slot 29 extending transversely therethrough for the slidable acceptance of a pressure plate 30. The pressure plate 30 is adapted to compress an electrical conductor 31, for example a high voltage line conductor, against a bottom face 32 of the slot 29. The slot 29 has a vertical threaded section 34 for the accommodation of a locking screw 35. The pressure plate is rotatably secured to the locking screw 35 as by a rivet 36. An inverted cup-shaped handle 39 is rigidly affixed, as by molding, to the locking screw 35. The handle 39 has suitable serrations 40 in the peripheral edge thereof to facilitate hand rotation of the screw 35.

The connector 20 has a radially outwardly extending projection 41 that is accepted within a transversely extending generally circular aperture 42 in the upper end of the insulator 11. The aperture 42 communicates with the recess 22 in the insulator 11. A vertical, radially outwardly extending slot 44 in the upper end of the insulator 11 communicates with both the recess 22 and with the aperture 42 for a reason to be discussed. It is to be noted that the handle 39 is of sufficient diameter to overlie the entire upper end of the insulator 11 and particularly the slot 44 and projection 41.

The insulator 11 has a radial flange 45 intermediate the ends thereof with a horizontally disposed annular recess 46 in a transverse end face 47 thereof. The larger diameter of the recess 46 is spaced radially inwardly from the peripheral edge of the flange 45 to give the end face 47 on the flange 45 an annular configuration.

The insulator 11 has an elongated, axially extending peripheral recess 48 spaced axially downwardly from the flange 45 for the acceptance of a radially inwardly directed annular rib 49 on a collar 50. The collar 50 has an external thread 51 for engagement in, for example, an aperture 52 in a housing 53 of a transformer (not shown). The rib 49 on the collar 50 bears against a lower end face 54 of the annular recess 48 in the insulator 11 to bias the insulator 11 downwardly with respect to the transformer housing 53. The collar 50 has a relatively long axial dimension to maximize its facing area with respect to the rod 15 so as to reduce the electrical stress therebetween. This is a distinct improvement over mounting collars heretofore used that characteristically have sharp edges in proximate relation to the energized components of the bushing. Also, the collar 50 has an outwardly directed radius on the inner upper end thereof that covers and shields the sharp peripheral edge of the aperture 52. The aforementioned details reduce electrical stress between the collar 50 and the rod 15 which thereby reduces corona and radio noise heretofore characteristic in such bushing installations. Downward movement of the insulator 11 is limited by engagement of the face 47 on the flange 45 with the transformer housing 53. A gasket 55 is disposed within the recess 46 in the flange 45 to seal the junction of the insulator 11 with the transformer housing 53 against the passage of foreign material. It is to be noted that compression of the gasket 55 is limited by engagement of the face 47 with the housing 53.

The collar 50 is rotatable with respect to the housing 53, to effect engagement therebetween, by a spanner wrench (not shown) having a suitable lug that is accepted in one of a plurality of spaced holes 56 in the collar 50.

It is to be noted that the porcelain insulator 11 is rotatable with respect to the collar 50 without loosening the insulator 11 with respect to the collar 50 or enclosure 53. This is to facilitate alignment of the slot 44 in the insulator 11 with a conductor or electrode 57 that is electrically connected to suitable lightening arresting apparatus. Thus, to set the gap between the projection 41 and the electrode 57, the insulator is first rotated to align the projection 41, slot 44, and electrode 57. The electrode 57 is then advanced or retracted to a suitable gap setting, and then the handle 39 is installed. The slot 44 facilitates gauging of the gap between the projection 41 and the electrode 57.

The lower end 18 of the conductor rod 15 extends through a hole 59 in an end closure 60. The end closure 60 has a radial flange 61 for engagement with an end face 62 on the insulator 11 and an axially inwardly extending boss 63 that locates the end closure 60 and conductor rod 15 radially with respect to the insulator 11.

The conductor rod 15 extends through the end closure 60 and into a blind recess 64 (FIG. 3) in a terminal member 65. The terminal member 65 is of hexagonal cross section and made of conductive material, for example copper. The terminal member 65 is secured to the rod 15 by a spring taper pin 66 that extends transversely through the terminal member 65 and end portion 18 of the rod 15 to positively lock the terminal 65 to the rod 15.

A connector housing 70 accepts the terminal member 65 interiorly thereof and has a pair of downwardly extending slots 71 and 72 terminating in re-entrantly directed cutouts 74 and 75, respectively, for the locking acceptance of the pin 66 on the terminal member 65. The terminal member 65 makes a positive electrical connection with a contact flange 76 on a contact member 77 that is biased outwardly of the housing 70 by a contact spring 78. The contact flange 76 is electrically connected to a fuse wire 79 of a fuse 80 through a conductive coupling screw or fuse terminal 81. The contact member 77 is threadably engaged with the coupling screw 81, which, in turn, is threadably engaged in an insulating fuse housing 82.

The insulating housing 82 of the fuse 80 has a pair of spaced peripheral recesses 84 for the acceptance of one leg 85 of a retainer spring 86. The other leg 88 of the spring 86 is embedded, as by molding, in an insulating mounting bracket 89 that is supported in any suitable manner within, for example, a transformer housing (not shown).

If so desired, the contact member 77 and connector housing 70 can be connected to a flexible conductor 90, as by conventional soldering or crimping.

Referring to FIG. 6, a modified form of electrical bushing 100 comprises a solderless connector 102 disposed in a recess 104 in an upper end portion 106 of an insulator 108. The solderless connector 102 has a vertical bore 110 therein for the acceptance of a suitably threaded screw 112. The screw 112 has an upper end portion 114 that is embedded in an insulating cap member 116. Rotation of the cap member 116 therefore effects rotation of the screw 112 and downward movement thereof in the bore 110.

The screw 112 has a central bore 120 therein for the acceptance of a vertically extending helical compression spring 122. The helical compression spring 122 normally biases a pressure plate 124 downwardly in a transverse slot 126 in the solderless connector 102. The downward bias of the spring 122 on the pressure plate 124 effects a positive predetermined contact pressure on a conductor 128.

A lower end portion 130 of the solderless connector 102 has a threaded vertical bore 132 therein for the acceptance of the threaded end portion 17 of the conductor rod 15.

The solderless connector 102 has a threaded transverse bore 140 therein for the acceptance of a suitably threaded conductive screw 142 that extends into a transverse aperture 144 in the upper end portion 106 of the insulator 108. The screw 142 is movably axially of the bore 140 to effect adjustment of the spacing between the screw 142 and a suitable grounding conductor (not shown).

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An electrical bushing for conducting electrical energy from a source through an aperture in a nonenergized member to an electrically operated device comprising an elongated tubular insulator, a first electrical conductor within said insulator and extending longitudinally thereof, means at one end of said first conductor for electrically connecting said conductor to said electrically operated device, means at the other end of said first conductor for electrically connecting said first conductor to the source of electrical energy, and means for supporting said bushing with respect to said nonenergized member comprising a radial flange on said insulator intermediate the ends of said insulator, an annular collar disposed about said insulator and having a portion engageable with said insulator, said collar having a threaded portion on the outer peripheral surface thereof for engagement with the nonenergized member adjacent the aperture therein, said collar being rotatable with respect to said member and bushing to effect relative movement between said bushing and member to bias said flange against said member.

2. Electrical apparatus comprising a nonenergized member having an aperture therein, and means for conducting electrical energy from a source through said aperture to an electrically operated device comprising an elongated tubular insulator bushing, a first electrical conductor within said insulator bushing and extending longitudinally thereof, means at one end of said conductor for electrically connecting said conductor to said electrically operated device, means at the other end of said first conductor for electrically connecting said first conductor to the source of electrical energy, and means for supporting said bushing with respect to said nonenergized member comprising a radial flange on said insulator intermediate the ends of said insulator, an axially extending peripheral recess in said insulator adjacent said flange, an annular collar disposed about said insulator and having a portion disposed in and engageable with an end face of said axially extending recess, said collar having a threaded portion on the outer peripheral surface thereof for threadable engagement with said nonenergized member adjacent the aperture therein, said collar being rotatable with respect to said member and insulator bushing to bias said portion against said end face thereby biasing said flange against said member.

3. Electrical apparatus comprising a nonenergized member having an aperture therein and means for conducting electrical energy from a source through the aperture in said nonenergized member comprising an elongated tubular insulator, a first electrical conductor within said insulator and extending longitudinally thereof, means at one end of said conductor for electrically connecting said conductor to said electrically operated device, means at the other end of said first conductor for electrically connecting said first conductor to the source of electrical energy, and means for supporting said bushing with respect to said nonenergized member comprising a radial flange on said insulator intermediate the ends of said insulator, an annular radially extending recess in a transverse face of said flange defining a peripheral shoulder thereon, an annular gasket disposed in said recess and engaging said flange and said member, an axially extending peripheral recess on said insulator adjacent said flange, an annular collar disposed about said insulator and having a portion disposed in and engageable with an end face of said axially extending recess, said collar having a threaded portion on the outer peripheral surface thereof for engagement with said nonenergized member adjacent the aperture therein, said collar being rotatable with respect to said member to bias said portion against said end face and bias said shoulder against said member to limit compression of said gasket.

4. An electrical bushing for conducting electrical energy from a source through an aperture in a nonenergized member to an electrically operated device comprising an elongated tubular insulator, a first electrical conductor within said insulator and extending longtiudinally thereof, means at one end of said conductor for electrically connecting said conductor to said electrically operated device, means at the other end of said first conductor for electrically connecting said first conductor to the source of electrical energy, and means for supporting said bushing with respect to said nonenergized member comprising a radial flange on said insulator intermediate the ends of said insulator, an annular radially extending recess in a transverse face of said flange, an axially extending peripheral recess in said insulator adjacent said flange, an annular collar disposed about said insulator having a first portion disposed in said radially extending recess and a second portion disposed in said axially extending recess and a generally smooth arcuate surface connecting said portions, said collar having means for biasing said flange toward said member.

5. An electrical bushing comprising an elongated tubular insulator having a counter recess at one end, a first electrical conductor extending longitudinally and centrally of said insulator, means at one end of said first conductor for electrically connecting said conductor to a second conductor comprising a first cup-shaped contact member disposed about said one end of said first conductor, a locking pin extending transversely through said first contact member and said first conductor, a second contact member having a terminal flange thereon, a tubular housing engageable with said locking pin and surrounding said first and second contacts, a spring disposed about said second contact and extending between said housing and said terminal flange for biasing said first and second contacts into positive electrical contact, a fuse wire electrically connected to an end portion of said second contact, an insulating member surrounding the end portion of said second contact, a fuse housing surrounding said fuse wire and spaced therefrom by said insulating member, and a connector at the other end of said first conductor for electrically connecting said first conductor to a source of electrical energy.

References Cited in the file of this patent

UNITED STATES PATENTS

| | | |
|---|---|---|
| 1,859,767 | Dowick | May 24, 1932 |
| 2,029,140 | Treanor | Jan. 28, 1936 |
| 2,069,239 | Fraser | Feb. 2, 1937 |
| 2,104,108 | Webb | Jan. 4, 1938 |
| 2,564,181 | Van Ryan | Aug. 14, 1951 |
| 2,664,457 | Joublanc | Dec. 29, 1953 |
| 2,728,810 | Ziehr | Dec. 27, 1955 |
| 2,740,100 | Broverman | Mar. 27, 1956 |
| 2,866,173 | Newcombe | Dec. 23 1958 |
| 2,883,640 | Duenke | Apr. 21, 1959 |
| 2,934,593 | Kollinger | Apr. 26, 1960 |

FOREIGN PATENTS

| | | |
|---|---|---|
| 565,677 | Canada | Nov. 4, 1958 |